United States Patent Office 3,327,023
Patented June 20, 1967

3,327,023
POLYOXYMETHYLENE POLYMER
STABILIZATION
Peter Otto Schoenholzer, Monchaltorf, Switzerland, assignor to E. I. du Pont de Nemours and Company, Wilmington, Del., a corporation of Delaware
No Drawing. Filed Sept. 11, 1963, Ser. No. 308,080
3 Claims. (Cl. 260—901)

This invention deals with the stabilization of acetal resins, and, more particularly, with the employment of a tertiary amine-containing polymer which acts as a catalyst for the stabilization of polyoxymethylene, and provides additional thermal protection after completion of the stabilization reaction.

The prior art has recognized that certain compounds containing tertiary amines are useful as catalysts in the esterification of the terminal portions of the polyoxymethylene chains with a carboxylic acid anhydride. Although these tertiary amines are efficient catalysts for the esterification of polyoxymethylene, they have a deleterious effect on the thermal stability of the resultant product, and must be removed therefrom after completion of the esterification reaction. Cf. United States Patent 2,998,409, issued on August 29, 1961, to S. Dal Nogare et al., wherein selected tertiary amines are disclosed as catalysts for the esterification of polyoxymethylene by an acid anhydride. The relatively volatile tertiary amines are removed from the polymer during the esterification reaction and consequently impart no thermal stability to the esterified material in addition to complicating the process for recovery of the excess esterification reagent. The non-volatile amines must also be removed from the polymer in various manners because they destabilize the esterified polymer. The prior art has also been concerned with the polymerization of formaldehyde in the presence of a tertiaryamino nitrogen-containing polymers and copolymers, wherein the formaldehyde polymerizes at the site of the tertiaryamino nitrogen, thereby chemically incorporating the nitrogen in the oxymethylene chain. However, the employment of such a copolymer as an esterification catalyst and thermal stabilizing agent is not disclosed nor suggested. Cf. United States Patent 2,844,561, issued July 22, 1958, to M. F. Bechtold et al.

It is an object of the present invention to provide a polyoxymethylene carboxylate of improved thermal stability. Another object of the present invention is to provide a highly efficient catalyst for the esterification of polyoxymethylenes. A further object of the present invention is to provide a polymeric composition which readily reacts with a carboxylic acid anhydride to form a polyoxymethylene carboxylate which exhibits exceptional thermal stability without additional treatment. Other objects will appear hereinafter.

The above objects are accomplished by reacting a polymeric composition which consists of a high molecular weight polyoxymethylene having from 0.01 to 4%, and preferably 0.1 to 2.0%, by weight based upon the polyoxymethylene of a tertiaryamino nitrogen-containing polymer which is substantially non-volatile with a carboxylic acid anhydride, and thereafter recovering a thermally stabilized polyoxymethylene carboxylate. More particularly, the tertiaryamino nitrogen-containing polymers may have repeating units of the general formulas (1)

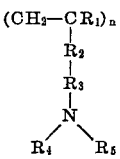

wherein $R_1$ is selected from the class consisting of hydrogen, alkyl groups having 1 to 6 carbon atoms; $R_2$ is selected from the class consisting of oxygen, carboxyl, and phenyl; $R_3$ is an alkylene group having 1 to 6 carbon atoms; $R_4$ and $R_5$ are alkyl groups having 1 to 6 carbon atoms wherein the total carbon atoms in groups 4 and 5 are less than 8 and $n$ is a positive integer greater than about 10;

(2)

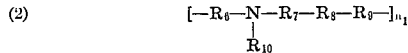

where $R_6$ and $R_7$ are alkylene groups having 0 to 6 carbon atoms; $R_8$ is selected from the class consisting of a group having the formula

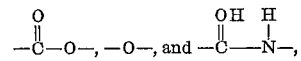

$R_9$ is an alkylene group having 0 to 6 carbon atoms; $R_{10}$ is an alkyl group having 1 to 12 carbon atoms; and $n_1$ is a positive integer; and (3)

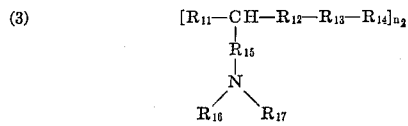

wherein $R_{11}$ and $R_{12}$ are alkylene groups having 1 to 6 carbon atoms; $R_{13}$ is a group selected from the class consisting of

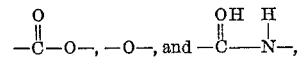

$R_{14}$ and $R_{15}$ are alkylene groups having 0 to 6 carbon atoms; and $R_{16}$ and $R_{17}$ are alkyl groups having 1 to 6 carbon atoms wherein the total carbon atoms in groups $R_{16}$ and $R_{17}$ are less than 8 and $n_2$ is a positive integer.

The aforementioned units in Group 1 may be present as the sole constituent of the polymer chain or may be interspersed with one or more comonomers, e.g., the preferred class of tertiaryamino nitrogen-containing polymers are the acrylic polymers wherein groups having the formula

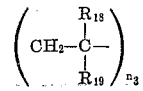

wherein $R_{18}$ is selected from the class consisting of hydrogen and alkyl groups having 1 to 4 carbon atoms; $R_{19}$ is selected from the class consisting of hydrogen, normal alkyl groups having 1 to 4 carbon atoms; aryl and substituted aryl groups having 6 to 12 carbon atoms; carboalkoxy groups having 1 to 5 carbon atoms and $n_3$ is a positive integer.

In the preferred embodiment of the present invention, the tertiary amine groups are introduced in a copolymer containing 5 to 95% by weight of the tertiaryamino nitrogen-containing acrylic polymer and 95% to 5% by weight of an alkyl methacrylate, e.g., methyl methacrylate with the preferred composition being the mixture containing 80% by weight methyl methacrylate and 20% by weight diethylaminoethyl methacrylate. In the preferred copolymer, the molecular weight should be 1000 to 100,000 corresponding approximately to an inherent viscosity as measured in a solution of the polymer at a concentration of 0.5000 gram of polymer per 100 ml. of chloroform at a temperature of 25° C. of 0.1 to 1.4. The vapor pressure of the copolymer should be below 1 mm. of mercury at 200° C.

The advantages of the present invention lie in the fact that compositions consisting of a high molecular weight polyoxymethylene and a tertiaryamino nitrogen-containing copolymer are readily susceptible to reaction with an esterification agent, e.g., acetic anhydride, and after reaction with the anhydride, the amine-containing polymer may be retained in the composition for enhanced thermal stability of the final product.

The thermal stability of the polymeric compositions of the present invention was determined by heating a sample of the stabilized polymer in a glass syringe in an inert nitrogen atmosphere at the temperatures indicated and measuring the gas evolved over a 30 minute period. More particularly, the thermal stability was measured by compressing a 0.5±0.01 gm. sample of polymer into a pellet about 10 mm. in diameter which is weighed to within 0.1 mg. The pellet is placed in a clean glass syringe having a capacity of 50 cc. which is sealed at the usual outlet and which has a glass tube inserted lengthwise through the plunger. This tube permits air to be expelled as the plunger is lowered and allows nitrogen to be introduced into the area of the syringe containing the polymer sample. A rubber serum stopper is placed on the outer end of the tube and the syringe is filled with nitrogen by inserting a hypodermic needle through the stopper following which the syringe is evacuated. This procedure is repeated until all the air is removed from the syringe while the plunger is coated with a small amount of silicone oil to ensure a tight fit with the body of the syringe and to provide adequate lubrication between the moving parts. After the final evacuation, the syringe is immersed in a vapor bath at the temperature indicated and the volume of gas evolved per unit time is measured. The volume of gas, in cc., evolved during a period of 30 minutes per 0.5 gram of sample is recorded as the thermal stability of the sample.

The following examples are presented to illustrate and not to restrict the present invention. Parts and percentages are by weight unless otherwise noted.

EXAMPLES 1–8

The apparatus which was employed to treat the composition of the present invention consisted of two concentric glass tubes, the I.D. of the inside tube being 25 mm. and the I.D. of the outside tube being 38 mm. with an overall length of the two tubes of 700 mm. The outside tube was arranged as a jacket for the inner tube and designed so that vapors of a condensable liquid could be introduced near the bottom and removed at the top. By controlling the pressure within the jacket, the temperature of the boiling liquid could be controlled thereby controlling the temperature within the inner tube. Suitable condensers were arranged at the upper end of the reactor to handle the gas passed therethrough. Approximately 100 mm. above the bottom of the tube, a fine mesh wire screen was supported in the inner tube to retain polymer which was introduced as a finely divided powder after the tertiaryamino nitrogen-containing polymer was mixed therethrough in the amounts indicated. The esterification reagent which in these examples was acetic anhydride was introduced in the bottom of the inner tube at a preset rate, and was vaporized by the heated jacket and raised to the temperature of the vapors in the jacket. The apparatus was operated as follows:

In each example, 20 grams of unstabilized polyoxymethylene which had been prepared according to the general process of United States Patent 2,994,687, issued Aug. 1, 1961, to Goodman et al. were mixed with the tertiaryamino nitrogen-containing acrylic copolymers in the amounts indicated and were charged to the reactor resting upon the aforementioned screen. Vapors of acetic anhydride were introduced at the base of the reactor passing up-flow through the polymer at a rate of 60 ml. per hour and at a temperature and for the time indicated in Table 1. In each example, after the indicated time had elapsed, the anhydride flow was stopped and the reactor was purged with nitrogen for five minutes to remove any residual acetic anhydride from the polymer. The polymer was removed from the reactor, weighed and analyzed for thermal stability which values are reported in Table 1. Examples 1 and 2 demonstrate the marked increase in thermal stability by the employment of the tertiaryamino nitrogen-containing acrylic polymer, and Examples 3 through 8 show that for each particular time of stabilization the amino nitrogen-containing polymers provided a product which had a 2- to 3-fold improvement in thermal stability as compared to polymer which had been treated with acetic anhydride in the absence of a tertiaryamino nitrogen-containing polymer.

EXAMPLES 9–16

A series of stabilization reactions were carried out according to the process described in Examples 1–8, wherein the percentage of dimethylaminoethyl methacrylate in the methyl methacrylate copolymer was varied from 11 to 100% thereby demonstrating that a wide range of the tertiaryamino nitrogen-containing acrylic polymer in the copolymer is operable as a stabilization catalyst and thermal stabilizer for the esterified resin. The results are reported in Table I.

TABLE I

| Example No. | Concentration of amine containing copolymer (percent by weight) | Composition of copolymer, percent dimethylaminoethyl methacrylate/percent methyl methacrylate | Time of stabilization (minutes) | Temperature of stabilization (° C.) | Stabilized polymer recovered (grams) | Thermal stability of recovered polymer | |
|---|---|---|---|---|---|---|---|
| | | | | | | 222° C. | 259° C. |
| 1 | 0 | | 60 | 159 | 18.65 | 25.5 | |
| 2 | 0.5 | 20/80 | 60 | 159 | 18.9 | 8.0 | |
| 3 | 0 | | 30 | 159 | | 52 | |
| 4 | 0.5 | 20/80 | 30 | 159 | 18.9 | 16 | 44 |
| 5 | 0 | | 60 | 159 | | 25 | |
| 6 | 0.5 | 20/80 | 60 | 159 | 18.9 | 8.0 | |
| 7 | 0 | | 90 | 159 | | 16.5 | |
| 8 | 0.5 | 20/80 | 90 | 159 | 18.6 | 6.5 | |
| 9 | 0.5 | 0/100 | 60 | 159 | 19 | | 56 |
| 10 | 0.5 | 11/89 | 60 | 159 | 19 | | 28 |
| 11 | 0.5 | 15/85 | 60 | 159 | 18.8 | | 25 |
| 12 | 0.5 | 20/80 | 60 | 159 | 18.9 | | 31 |
| 13 | 0.5 | 44/56 | 60 | 159 | 18.7 | | 33 |
| 14 | 0.5 | 55/45 | 60 | 159 | 18.8 | | 35 |
| 15 | 0 | | 60 | 159 | 18.7 | | 92 |
| 16 | 0.2 | 100/0 | 60 | 159 | 18.5 | 5.2 | |

EXAMPLE 17

The stabilization reaction was carried out as described in Example 2 except that a copolymer containing 25.5% by weight diethylaminoethyl methacrylate and 74.5% by weight methyl methacrylate was added to the polymer at a concentration of 0.5% by weight prior to the stabilization rate reaction. After treatment for 60 minutes at 159° C. with acetic anhydride vapor and purging with nitrogen as described in Example 2, the polymer was removed from the reactor and found to have a thermal stability of 23.5 at 259% C. as compared to a value of 75 for a similar polymer which had been stabilized without the addition of tertiaryamino nitrogen-containing copolymer.

EXAMPLE 18

The stabilization reaction was carried out as described in Example 2 except that a copolymer containing 23% by weight dimethylaminoethyl methacrylate and 77% by weight styrene was added to the polymer at a concentration of 0.5% by weight prior to the stabilization reaction in place of the copolymer employed in Example 2. After treatment for 60 minutes at 159° C. with acetic anhydride vapor and purging with nitrogen as described in Example 2, the polymer was removed from the reactor and found to have a thermal stability of 47 at 259° C. as compared to a value of 92 for a similar polymer which had been stabilized without the addition of tertiaryamino nitrogen-containing copolymer.

EXAMPLE 19

The stabilization reaction was carried out as described in Example 2 except that a polyamide of N-dodecyliminodiacetic acid and pentamethylene diamine of a molecular weight of about 1000 was added to the polymer at a concentration of 1.0% by weight in place of the copolymer employed in Example 2. After treatment for 60 minutes at 159° C. with acetic anhydride and nitrogen purging exactly as in Example 2, the polymer was found to have a thermal stability of 6.8 measured at 222° C. as compared to 24.3 for a similar polymer stabilized without the addition of tertiaryamino nitrogen-containing polymer.

EXAMPLE 20

The stabilization reaction was carried out as described in Example 2 except that a polyester of N-dodecyliminodiacetic acid and 1,4-butanediol was added to the polymer at a concentration of 0.2% by weight in place of the copolymer employed in Example 2. After treatment for 60 minutes at 159° C. with acetic anhydride and nitrogen purging exactly as in Example 2, the polymer was found to have a thermal stability of 8.7 measured at 222° C. as compared to 22.2 for a similar polymer stabilized without the addition of tertiaryamino nitrogen-containing polymer.

EXAMPLES 21–23

A series of stabilization experiments were carried out in the apparatus as described in Example 1 at temperatures of 150, 155, and 159° C. upon polyoxymethylenes as described in Example 1 containing 0.5% by weight of a copolymer containing 13.3% dimethylaminoethyl methacrylate and 86.7% by weight methyl methacrylate. In each case, the acrylic copolymer was added to the unstabilized polymer by coating the solid polyoxymethylene with a solution of the copolymers in toluene. A substantially similar series of experiments were executed at the same temperatures as mentioned above, but in the absence of the tertiaryamine-containing copolymer. After the polyoxymethylene had been treated with acetic anhydride in the absence of catalyst, a copolymer of the same composition and at the same concentration as above was added to the stabilized material; the results of these experiments are set forth in Table II which show that the copolymer imparts some thermal stability to the polyoxymethylene even if it is added after the stabilization reaction, but imparts a markedly greater stabilizing effect if it is added before treatment of the polymer with acetic anhydride.

The foregoing examples show the use of acetic anhydride as the esterification reagent, however, broad classes of carboxylic acid anhydrides, such as those disclosed in United States Patent 2,964,500, issued Dec. 13, 1960, to S. H. Jenkins et al., are considered operable in the present process.

With the execption of Examples 17 and 18 hereinabove, the acrylic copolymers illustrated hereinabove were dimethylaminoethyl methacrylate and methyl methacrylate. It should be noted, however, that a wide variety of tertiaryamino nitrogen-containing acrylic polymers from acrylic monomers such as dimethylaminoethyl acrylate,
diethylaminoethyl acrylate,
dimethylaminomethyl acrylate,
dimethylaminomethyl methacrylate,
methylethylaminoethyl methacrylate,
methylhexylaminoethyl methacrylate, and
ethylhexylaminoethyl methacrylate, are also operable.

The foregoing tertiaryamino nitrogen-containing acrylic monomers may be copolymerized with monomers such as methyl acrylate, methyl methacrylate, ethyl acrylate, butyl acrylate, or, in general terms, alkyl acrylates, ethylene, styrene, propylene, butadiene, and vinyl chloride. In addition to acrylic polymer, polyamides, polyesters, such as the condensation products of N-dodecyliminodiacetic acid with 1,4 - butanediol and N - pentyliminodiethanol with adipic acid, and vinyl polymers which contain a tertiary nitrogen atom are also operable in the present invention. The active amine group may be present in the backbone of the polymer chain, or in a branch, depending upon the particular type of polymer selected. As a general rule, the polymer employed must not attack or destabilize polyoxymethylene and should be soluble in acetic anhydride at 140° C. and nonvolatile at 160° C. while remaining stable at the latter temperature. Polymers in which the nitrogen atom is adjacent to large alkyl groups and presumably sterically hindered are not suitable for the practice of the present invention, e.g., copolymers of dimethylaminoethyl methacrylate with lauryl methacrylate are inactive as catalysts in the present invention. The adjacent groups should have less than 8 and preferably less than 6 carbon atoms to prevent the nitrogen atom from becoming sterically hindered. The term "polyoxymethylene" as employed herein refers to any type of acetal homopolymer and copolymer which is susceptible to esterfication by treatment with a carboxylic acid anhydride or equivalent material, and generally will encompass polyoxymethylenes having a terminal hydroxyl group which hydroxyl group reacts with the esterification agent to produce an ester end group, which end group is more stable than the original hydroxyl group.

The stabilized composition of the present invention can be transformed into many useful articles by extrusion or injection molding, e.g., films, funicular structures such as filaments, bristles, and fibers, and molded parts in general. In addition, the composition of this invention may contain pigments, fillers, reinforcing agents, or other polymeric substances in addition to the tertiary-amino nitrogen-containing polymers.

I claim:

1. A process for the stabilization of high molecular

TABLE II

| Example | Concentration of acrylic copolymer | Temperature of stabilization | Thermal stability | | |
|---|---|---|---|---|---|
| | | | No copolymer added | Copolymer added before stabilization | Copolymer added after stabilization |
| 21 | 0.5 | 150 | 66 | 26.7 | 61 |
| 22 | 0.3 | 155 | 40 | 12.8 | 36 |
| 23 | 0.5 | 159 | 18.2 | 8.9 | 15.4 | weight polyoxymethylene having 1 to 2 of its terminal valences satisfied with a hydroxyl group, which process comprises adding a tertiaryamino nitrogen-containing copolymer having a molecular weight of at least 1000 to said polyoxymethylene, contacting the mixture thus obtained with a carboxylic acid anhydride, and thereafter recovering a thermally stable polyoxymethylene carboxylate having said copolymer dispersed therein.

2. A process for the stabilization of high molecular weight polyoxymethylene having 1 to 2 of its terminal valences satisfied with a hydroxyl group, which process comprises adding a tertiaryamino nitrogen-containing acrylic copolymer having a molecular weight of at least 1000 to said polyoxymethylene, contacting the mixture thus obtained with a carboxylic acid anhydride, and thereafter recovering a thermally stable polyoxymethylene carboxylate having said copolymer dispersed therein.

3. A process for the stabilization of a high molecular weight polyoxymethylene having 1 to 2 of its terminal valences satisfied with a hydroxyl group, which process comprises intimately dispersing an acrylic copolymer consisting essentially of 80 parts methyl methacrylate and 20 parts diethylaminoethyl methacrylate upon said polyoxymethylene, and thereafter contacting the resultant mixture with a carboxylic acid anhydride having 4 to 10 carbon atoms, and finally removing unreacted anhydride from said mixture and recovering a thermally stable polyoxymethylene carboxylate having said acrylic copolymer dispersed therein.

References Cited
UNITED STATES PATENTS

| | | | |
|---|---|---|---|
| 2,844,561 | 7/1958 | Bechtold et al. | 260—67 |
| 2,993,025 | 7/1961 | Alsup et al. | 260—42 |
| 3,125,551 | 3/1964 | Punderson | 260—67 |
| 3,218,295 | 11/1965 | Cline | 260—67 |

FOREIGN PATENTS

| | | |
|---|---|---|
| 807,589 | 1/1959 | Great Britain. |

WILLIAM H. SHORT, *Primary Examiner.*

L. M. PHYNES, *Assistant Examiner.*